US009579938B2

(12) United States Patent
McIntyre et al.

(10) Patent No.: US 9,579,938 B2
(45) Date of Patent: Feb. 28, 2017

(54) APPARATUS AND METHOD TO ADJUST LF SENSITIVITY OF TPM SENSOR

(71) Applicant: Continental Automotive Systems, Inc., Auburn Hills, MI (US)

(72) Inventors: Matthew D McIntyre, New Baltimore, MI (US); Jean-Christophe Deniau, Fenton, MI (US); Brian Farrell, Troy, MI (US); Yasser Gad, Macomb, MI (US); Dhivya Vijayan, Rochester Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/727,240

(22) Filed: Jun. 1, 2015

(65) Prior Publication Data
US 2016/0347133 A1    Dec. 1, 2016

(51) Int. Cl.
*B60C 23/00* (2006.01)
*B60C 23/04* (2006.01)

(52) U.S. Cl.
CPC ...... *B60C 23/0474* (2013.01); *B60C 23/0422* (2013.01)

(58) Field of Classification Search
CPC ............ B60C 23/0433; B60C 23/0445; B60C 23/0479
USPC ................................. 340/442, 445, 447–449
See application file for complete search history.

(56) References Cited

U.S. PATENT DOCUMENTS

| 5,612,671 | A | 3/1997 | Mendez et al. |
| 5,661,804 | A | 8/1997 | Dykema et al. |
| 6,243,007 | B1 | 6/2001 | McLaughlin et al. |
| 6,904,796 | B2 * | 6/2005 | Pacsai ................. B60C 23/0433 |
| | | | 73/146 |
| 7,173,520 | B2 | 2/2007 | Desai et al. |
| 7,243,535 | B2 | 7/2007 | Shimura |
| 7,592,904 | B2 | 9/2009 | Kochie et al. |
| 7,688,192 | B2 | 3/2010 | Kenny et al. |
| 8,368,524 | B2 | 2/2013 | Oda |
| 8,659,412 | B2 | 2/2014 | Deniau |
| 8,692,661 | B2 | 4/2014 | Deniau et al. |
| 8,912,896 | B1 | 12/2014 | Yu et al. |
| 2002/0174925 | A1 | 11/2002 | Wilson et al. |

(Continued)

FOREIGN PATENT DOCUMENTS

CA    2781355 A1    12/2013
CN    102837569 A    12/2012

(Continued)

OTHER PUBLICATIONS

Search Report dated Dec. 16, 2015, from corresponding GB Patent Application No. GB1510371.6.

(Continued)

*Primary Examiner* — Tai Nguyen

(57) ABSTRACT

A TPM sensor measures the pressure of a tire and determines whether the measured pressure is greater than a predetermined threshold. When the measured pressure is greater than the predetermined threshold, an adjustment to the sensitivity is determined by the sensor. The adjustment to the sensitivity is applied to the sensor to yield an adjusted sensitivity. The TPM sensor is operated to make receptions according to the adjusted sensitivity.

15 Claims, 4 Drawing Sheets

(56) References Cited

U.S. PATENT DOCUMENTS

| | | |
|---|---|---|
| 2005/0024194 A1* | 2/2005 | Ide .................. B60C 23/0408 340/445 |
| 2006/0071693 A1* | 4/2006 | Higuchi ............ B60C 23/0433 327/108 |
| 2006/0259214 A1 | 11/2006 | McQuade |
| 2007/0008097 A1 | 1/2007 | Mori et al. |
| 2008/0094198 A1 | 4/2008 | Yu |
| 2008/0197995 A1 | 8/2008 | Taki |
| 2009/0231114 A1 | 9/2009 | Yu |
| 2012/0050029 A1 | 3/2012 | Yu et al. |
| 2012/0262285 A1 | 10/2012 | Chen et al. |
| 2012/0262286 A1 | 10/2012 | Chen et al. |
| 2013/0061456 A1 | 3/2013 | Lefaure et al. |
| 2013/0226403 A1 | 8/2013 | Zhang |
| 2014/0165026 A1 | 6/2014 | Farrell et al. |
| 2014/0253311 A1 | 9/2014 | Chang et al. |
| 2014/0306815 A1 | 10/2014 | Barrett et al. |
| 2015/0015387 A1 | 1/2015 | Farrell et al. |
| 2015/0042464 A1 | 2/2015 | Chang et al. |

FOREIGN PATENT DOCUMENTS

| | | |
|---|---|---|
| CN | 102848866 A | 1/2013 |
| CN | 102862450 A | 1/2013 |
| CN | 103192669 A | 7/2013 |
| CN | 103332076 A | 10/2013 |
| CN | 203331757 U | 12/2013 |
| CN | 103587357 A | 2/2014 |
| CN | 103921628 A | 7/2014 |
| EP | 0671289 A1 | 9/1995 |
| EP | 1674299 A2 | 6/2006 |
| EP | 2423008 B1 | 2/2012 |
| EP | 2722201 A1 | 4/2014 |
| EP | 2810796 A1 | 12/2014 |
| EP | 2813379 A1 | 12/2014 |
| JP | 2012071755 A | 4/2012 |
| JP | 2012144083 A | 8/2012 |
| TW | 201441069 A | 11/2014 |
| TW | 201442891 A | 11/2014 |
| WO | 2013022437 A1 | 2/2013 |
| WO | 2013155952 A1 | 10/2013 |

OTHER PUBLICATIONS

International Search Report and Written Opinion dated Sep. 15, 2016 from corresponding International Patent Application No. PCT/US2016/035081.

* cited by examiner of these examples only determines whether the sensor recognizes commands, and, in aspects, does not alter the strength or level of the transmission sent from the sensor to the receiver.

APPARATUS AND METHOD TO ADJUST LF SENSITIVITY OF TPM SENSOR

TECHNICAL FIELD

This application relates to tire pressure monitors, and more specifically, the low frequency (LF) sensitivity of these sensors.

BACKGROUND OF THE INVENTION

Tire pressure monitoring (TPM) sensors are used in vehicles. These sensors (disposed at the tire) measure the pressure of the tire (and potentially other parameters) and transmit this to a receiver in the vehicle. When the pressure falls below a predetermined threshold, the receiver may warn the driver.

TPM sensors typically need to be triggered. This is often accomplished by a technician using an activation tool. Initiation devices in the vehicle can also be used. Low frequency (LF) commands are typically sent by these devices to the TPM sensor in order to perform the activation.

Some of the vehicle systems in which these TPM sensors are installed require the TPM Sensor be very sensitive to LF receptions. However, the heightened sensitivity may cause problems while the TPM sensor is being shipped or sitting on a shelf. If the TPM sensor is too sensitive, then it may be inadvertently activated by a LF trigger that was not intended for that sensor. This would lead to a decrease in battery life among other problems.

Because of these problems, some user dissatisfaction has developed with respect to previous approaches.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

The approaches described herein configure a TPM sensor based on the actions of a TPM system relearn tool or the vehicle, and lock the LF sensitivity to a value that is appropriate for that vehicle. In other words, the sensitivity of a TPM sensor is varied based upon some outside signal (from an LF tool, or some LF transmitter in the vehicle), state, action, or condition.

With the approaches described herein, the TPM sensor can have a lower LF sensitivity while it is being shipped or sitting on a shelf to avoid inadvertent activation. However, when the TPM sensor has measured pressure above a certain threshold and is acted upon a TPM system relearn tool or a vehicle action the LF sensitivity will change to a LF sensitivity level that is appropriate for the vehicle where the sensor is installed. The type of action by the TPM system relearn tool or a vehicle action will determine which vehicle type the TPM sensor is installed. This allows the TPM sensor to properly work on the vehicle while avoiding a negative effect to battery life while sitting on the shelf or while being shipped.

In many of these embodiments, a TPM sensor measures the pressure of a tire and determines whether the measured pressure is greater than a predetermined threshold. When the measured pressure is greater than the predetermined threshold, an adjustment to the sensitivity is determined by the sensor. The adjustment to the sensitivity is applied to the sensor to yield an adjusted sensitivity. The TPM sensor is operated to make receptions according to the adjusted sensitivity.

In some aspects, the adjustment is determined based upon the vehicle type. In other examples, a low frequency (LF) command is received from an external configuring and/or triggering entity or an indication of a vehicle action. The vehicle type is determined based upon the LF command or the indication of a vehicle action, and the magnitude of the adjustment is based upon the vehicle type. In some examples, the indication of vehicle action comprises an indication of acceleration of the vehicle. In other aspects, the adjusted sensitivity is locked into the TPM sensor.

Figure 1:
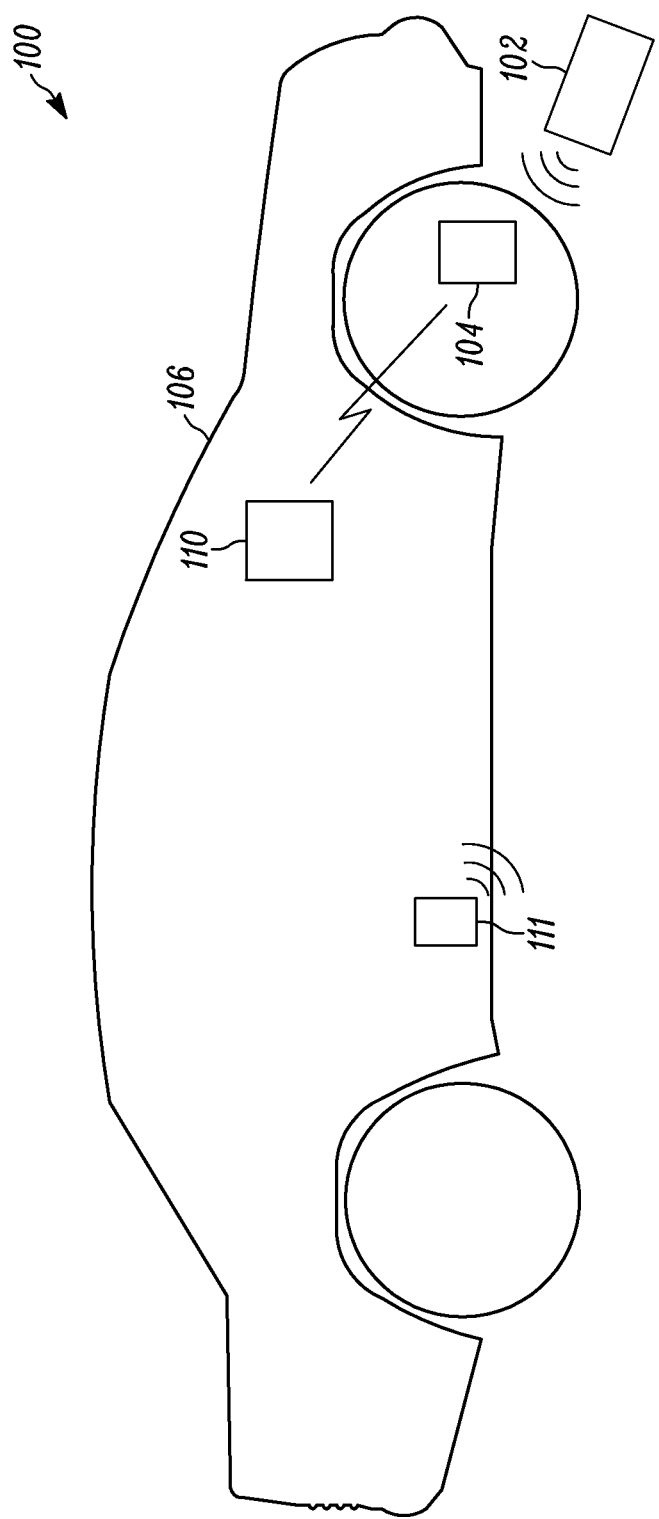
FIG. 1 comprises a block diagram of a TPM system according to various embodiments of the present invention.

Referring now to FIG. 1, a system 100 includes a LF triggering/data transfer (or relearn) tool 102, a sensor 104, a vehicle 106. The sensor 104 is disposed into the tires 108 of the vehicle. The vehicle 106 has a receiver 110 and may optionally include an LF initiator 111 (which transmits LF initiation commands automatically).

The LF triggering/data transfer (or relearn) tool 102 is a portable hand-held tool that is moved from sensor to sensor in order to program the sensors. The triggering/transferring of data may be done in the form of LF commands.

The LF initiator 111 is at a fixed location within the vehicle and also sends LF commands.

The sensor 104 measures the pressure of a tire and it may also measure other parameters. It receives commands from the tool 102 and/or the initiator 111. The commands configure the sensor to transmit transmissions to the receiver 110. The transmissions transmit the measured tire pressure to the receiver 110.

If the measured pressure is below a predetermined threshold, the receiver 110 can alert the driver that there is a problem with the tire. As discussed elsewhere herein, the sensor 104 receives commands or transmissions from the tool 102 or the initiator 111 and will either recognize or not recognize these commands according to a sensitivity. As described herein, the sensitivity is adjustable on-the-fly.

The lower the magnitude of sensitivity, the greater the ability of the sensor 104 to recognize receptions (i.e., the sensor 104 can recognize or "hear" messages better as its sensitivity level decreases). On the other hand and as the sensitivity level increases, the ability of the sensor to recognize receptions decreases. The sensitivity level in one aspect is a threshold above which messages are recognized and below which messages are not recognized.

The vehicle 106 may be any type of vehicle such as a car, motorcycle, truck, to mention a few examples.

In one example of the operation of the system of FIG. 1, the sensor 104 measures the pressure of a tire and determines whether the measured pressure is greater than a predetermined threshold. When the measured pressure is greater than the predetermined threshold, an adjustment to the sensitivity is determined by the sensor 104. The adjustment to the sensitivity is applied to the sensor 104 to yield an adjusted sensitivity. The TPM sensor 104 is operated to make receptions according to the adjusted sensitivity.

In some aspects, the adjustment is determined based upon the vehicle type. In other examples, a low frequency (LF) command is received from an external triggering entity or an indication of a vehicle action. The vehicle type is determined based upon the LF command or the indication of a vehicle action, and the magnitude of the adjustment is based upon the vehicle type. In some examples, the indication of vehicle action comprises an indication of acceleration of the vehicle. In other aspects, the adjusted sensitivity is locked into the TPM sensor 104.

Figure 2:
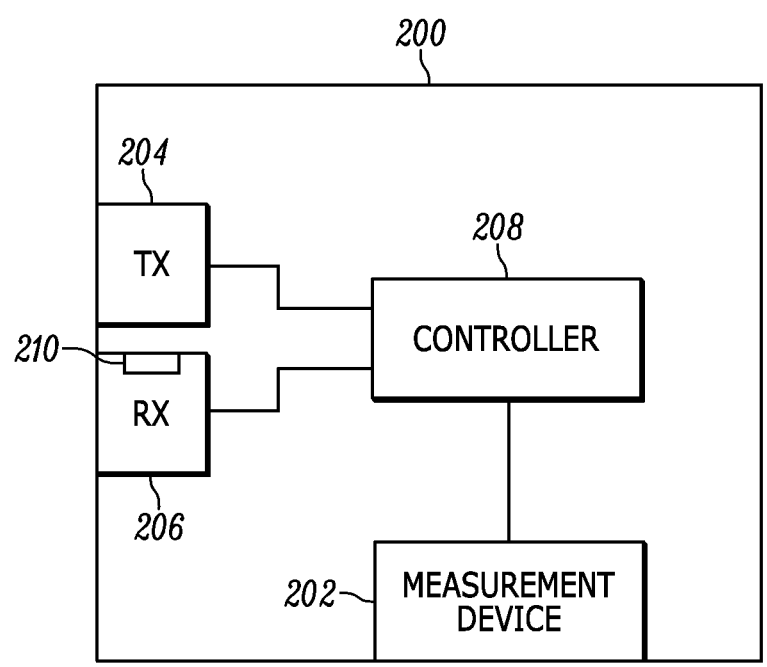
FIG. 2 comprises a block diagram of a TPM sensor according to various embodiments of the present invention.

Referring now to FIG. 2, one example of a TPM sensor 200 is described. The sensor 200 includes a measurement device 202, transmitter 204, receiver 206, and a controller 208. The TPM sensor 200 is configured to be disposed at a tire of a vehicle. The sensor 200 has a sensitivity for receptions, and the vehicle having an associated type.

The measurement device 202 is configured to measure the pressure of a tire. The receiver 206 is configured to receive commands according to a sensitivity, and the sensitivity is adjustable. The transmitter 204 transmits information to a receiver in the vehicle.

The controller 208 is coupled to the measurement device 202, the transmitter 204, and the receiver 206. The controller 208 is configured to determine whether the measured pressure is greater than a predetermined threshold and when the measured pressure is greater than the predetermined threshold, determine an adjustment to the sensitivity of the receiver 206. The controller 208 is further configured to apply the adjustment to the sensitivity to yield an adjusted sensitivity, and to operate the receiver 206 according to the adjusted sensitivity. The receiver 206 may have a sensitivity adjustment portion 210 where the sensitivity is adjusted, for example, by applying one of more amplifiers to the receiving circuitry.

Figure 3:
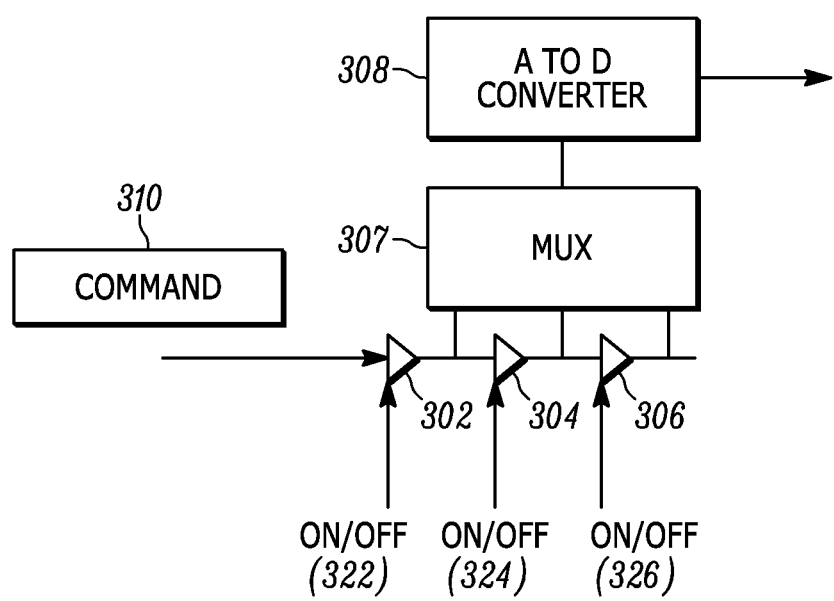
FIG. 3 comprises a block diagram of a sensitivity adjustment apparatus of a TPM sensor according to various embodiments of the present invention.

Referring now to FIG. 3, one example of the sensitivity adjustment portion 300 (e.g., element 210 of FIG. 2) of a receiver for TPM sensor is described. The sensitivity adjustment portion includes a first amplifier 302, a second amplifier 304, a third amplifier 306, a multiplexer 307, and an analog to digital converter 308.

A command 310 (in the form of a LF signal) is received at the input of the portion 300. Depending upon which amplifiers are activated, the command 310 will pass through some, all, or none of the amplifiers 302, 304, and 306. The output of these amplifiers is transmitted to the multiplexer 307, which multiplexes these signals onto a single line. The analog-to-digital converter 308 receives the multiplexed signal and either recognizes or does not recognize the signal (command) 310. If the command 310 is recognized (heard) then the command can be further processed by the controller (e.g., controller 208 of FIG. 2).

The first amplifier 302 is activated by a first on/off signal 322. The second amplifier 304 is activated by a second on/off signal 324. The third amplifier 306 is activated by a third on/off signal 326.

As mentioned, sensitivity is the ability to hear and recognize a signal. Sensitivity may also be represented as an amplitude band. To take one example, 1 nano Tesla sensitivity guarantees anything greater than 1 nano Tesla will trigger or be recognized. 10 Tesla sensitivity is less sensitive since it requires 10 Tesla to trigger or be recognized.

To take another example, the first amplifier 302 has a gain of two, the second amplifier 304 has a gain of 4, and the third amplifier 306 has a gain of 8. The analog-to-digital converter 308 has a threshold of 5 units (any signal above that level is recognized and processed). A 0.1 signal is received at the input. It will be appreciated that the measurement units in this example are all arbitrary.

When on shelf, all three amplifiers 304, 306, and 308 are deactivated. However, the receiving circuit needs a very "loud" LF to trigger the sensor. This behavior thus limits false triggering. All on/off lines are off meaning all the amplifiers 304, 306, and 308 are off.

In other situations first amplifier 304 is on and second and third amplifies 306, 308 are off 0.1 times two=0.2 is received by analog-to-digital but this is less than 5. The signal is not recognized in this situation.

In other examples, greater sensitivity is desired and all the amplifiers 304, 306, and 308 are activated. For a 0.1 signal that is applied to the circuit of FIG. 3. 0.1 is multiplied times 2, then times 4, and then times 8 and get 6.4. This is recognized by the circuit (and hence by the sensor) since it is greater than 5.

The on/off signals 322, 324, 326 are generated in one example by a controller. The on/off signals 322, 324, 326 may be based upon the mode of operation, whether moving, whether stationary, whether pressurized) to mention a few examples. The on/off signals 322, 324, 326 may also be based upon vehicle type, for example, vehicle manufacturer. The controller activates the appropriate on/off signals to activate/deactivate the appropriate amplifiers to yield the appropriate sensitivity level for the receiver.

Figure 4:
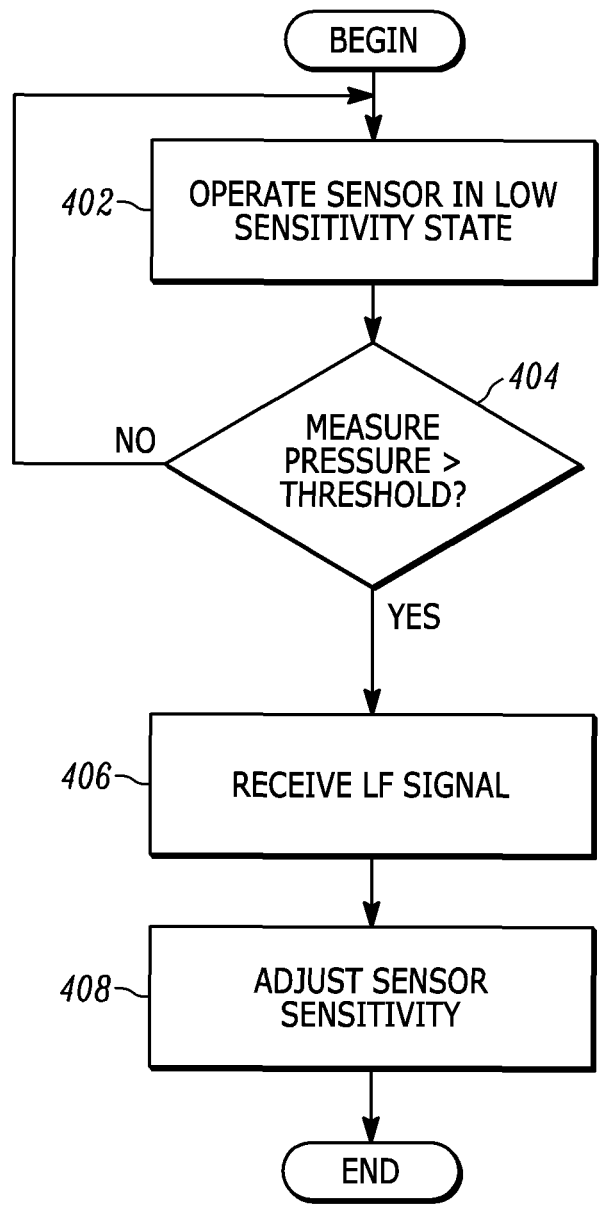
FIG. 4 comprises a flow chart of the operation of a TPM sensor according to various embodiments of the present invention.

Referring now to FIG. 4, one example of the operation of a sensor with adjustable sensitivity is described. At step 402, a TPM sensor is operated in a state having a sensitivity level that is less sensitive to LF commands (as compared to other states where the sensitivity level is much higher).

At step 404, it is determined if the measured pressure is above a predetermined threshold. If the answer is negative, control returns to step 402.

If the answer is affirmative at step 404, then at step 406, the TPM relearn tool or vehicle sends a LF command to the sensor. In another aspect, indication of another action (e.g., acceleration) by the vehicle is received at the sensor.

At step 408, the LF sensitivity of the sensor is adjusted to the level appropriate to the vehicle type of the vehicle in which the sensor is installed. The vehicle type can be determined from the LF command received from the tool or the action of the vehicle. For instance, the contents, value, amount, frequency, modulation, or other characteristic of the command or the action may inform the sensor that the vehicle type is from a certain manufacturer or of a certain category (e.g., luxury vehicle). In one example, a particular command format and/or modulation frequency may indicate a particular automobile manufacturer. Other examples are possible.

It should be understood that any of the devices described herein (e.g., the controllers, the receivers, the transmitters, the sensors, any presentation or display devices, or the external devices) may use a computing device to implement various functionality and operation of these devices. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method of programming a tire pressure monitoring (TPM) sensor, the TPM sensor comprising a receiver and a transmitter, the method comprising:
    at a TPM sensor disposed in a vehicle, the sensor having a sensitivity for receptions, and the vehicle having an associated vehicle type:
    measuring pressure of a tire and determining whether the measured pressure is greater than a predetermined threshold;
    when the measured pressure is greater than the predetermined threshold, determining an adjustment to the sensitivity of the sensor;
    applying the adjustment to the sensitivity to yield an adjusted sensitivity;
    operating the TPM sensor to make receptions according to the adjusted sensitivity.

2. The method of claim 1, wherein the adjustment is determined based upon the vehicle type.

3. The method of claim 2, further comprising receiving one of: a low frequency (LF) command from an external triggering entity or an indication of a vehicle action, wherein the vehicle type is determined based upon the LF command from external triggering entity or the indication of a vehicle action, and wherein a magnitude of the adjustment is based upon the vehicle type.

4. The method of claim 3, wherein the indication of vehicle action comprises an indication of acceleration of the vehicle.

5. The method of claim 1, further comprising locking the adjusted sensitivity into the TPM sensor.

6. A tire pressure monitoring (TPM) sensor configured to being disposed at a vehicle, the sensor having a sensitivity for receptions, and the vehicle having an associated type, the sensor comprising:
    a measurement device that is configured to measure the pressure of a tire;
    a receiver that is configured to receive commands from an external triggering entity according to a sensitivity, the sensitivity being adjustable;
    a transmitter for transmitting information, the information comprising measured tire pressure transmitted to a vehicle receiver;
    a controller coupled to the measurement device, the transmitter, and the receiver, the controller configured to determine whether the measured pressure is greater than a predetermined threshold and when the measured pressure is greater than the predetermined threshold, determine an adjustment to the sensitivity of the receiver; the controller configured to apply the adjustment to the sensitivity to yield an adjusted sensitivity, the controller configured to operate the receiver according to the adjusted sensitivity.

7. The TPM sensor of claim 6, wherein the adjustment is determined based upon the vehicle type.

8. The TPM sensor of claim 7, wherein the receiver is configured to receive one of: a low frequency (LF) command from an external triggering entity or an indication of a vehicle action, wherein the vehicle type is determined based upon the LF command from the external triggering entity or the indication of a vehicle action, and wherein a magnitude of the adjustment is based upon the vehicle type.

9. The TPM sensor of claim 8, wherein the indication of vehicle action comprises an indication of acceleration of the vehicle.

10. The TPM sensor of claim 6, wherein the controller is configured to lock the adjusted sensitivity.

11. A non-transitory computer usable medium having a computer readable program code embodied therein, the computer readable program code adapted to being executed to implement a method programming a tire pressure monitoring (TPM) sensor, the TPM sensor comprising a receiver and a transmitter, the method comprising:
    at a TPM sensor disposed in a vehicle, the sensor having a sensitivity for receptions, and the vehicle having an associated vehicle type:
    measuring pressure of a tire and determining whether the measured pressure is greater than a predetermined threshold;
    when the measured pressure is greater than the predetermined threshold, determining an adjustment to the sensitivity of the sensor;
    applying the adjustment to the sensitivity to yield an adjusted sensitivity;
    operating the TPM sensor to make receptions according to the adjusted sensitivity.

12. The non-transitory computer usable medium of claim 11, wherein the adjustment is determined based upon the vehicle type.

13. The non-transitory computer usable medium of claim 12, further comprising receiving one of: a low frequency (LF) command from an external triggering entity or an indication of a vehicle action, wherein the vehicle type is determined based upon the LF command from the external triggering entity or the indication of a vehicle action, and wherein a magnitude of the adjustment is based upon the vehicle type.

14. The non-transitory computer usable medium of claim 13, wherein the indication of vehicle action comprises an indication of acceleration of the vehicle.

15. The non-transitory computer usable medium of claim 11, further comprising locking the adjusted sensitivity into the TPM sensor.

* * * * *